G. O. TERRY.
CUTTING DEVICE FOR LEATHER SOLES.
APPLICATION FILED AUG. 16, 1920.
1,422,901.
Patented July 18, 1922.
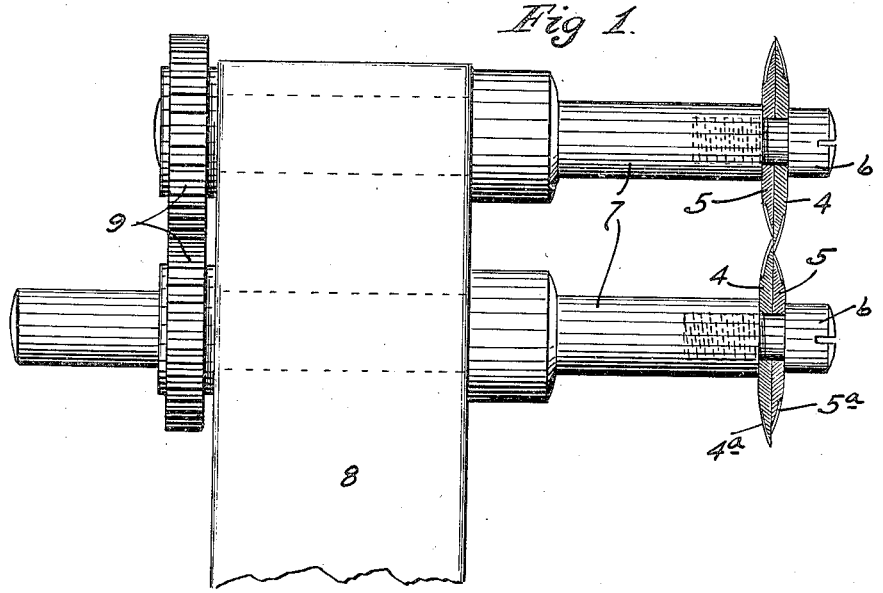
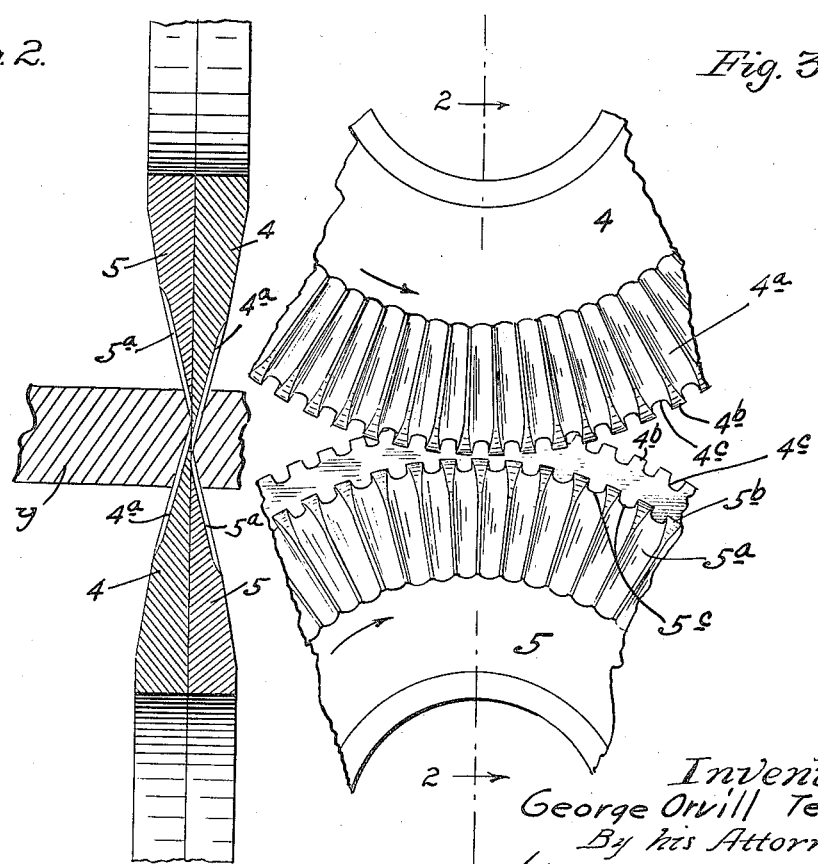
Inventor
George Orvill Terry
By his Attorneys
Williamson

UNITED STATES PATENT OFFICE.

GEORGE ORVILL TERRY, OF MINNEAPOLIS, MINNESOTA, ASSIGNOR TO ECONOMY SHOE MACHINE CO., OF MINNEAPOLIS, MINNESOTA, A CORPORATION OF MINNESOTA.

CUTTING DEVICE FOR LEATHER SOLES.

1,422,901.  Specification of Letters Patent.  Patented July 18, 1922.

Application filed August 16, 1920. Serial No. 403,647.

*To all whom it may concern:*

Be it known that I, GEORGE ORVILL TERRY, a citizen of the United States, residing at Minneapolis, in the county of Hennepin and State of Minnesota, have invented certain new and useful Improvements in Cutting Devices for Leather Soles; and I do hereby declare the following to be a full, clear, and exact description of the invention, such as will enable others skilled in the art to which it appertains to make and use the same.

My invention has for its object to provide an improved cutter especially adapted for cutting leather soles, or for cutting any heavy or tanned leather, such as usually known as sole leather, or for cutting belting, or the like.

Hitherto, sole leather, and the like, has been cut by cooperating sharp edged disks and some thereof have been provided with corrugations on one of the two faces or each thereof. Such corrugations assist in the feeding action, but as sole leather is very hard and requires considerable force to cause the same to travel between the co-operating cutting wheels, even the cutting wheels, corrugated as above described, have not always been found efficient for the feeding action.

The feeding action should be produced entirely by the cutting wheels themselves and this is imperative when irregular objects, such as soles, are to be cut out from leather sheets. I have fully solved the feeding problem, as well as the cutting action in my improved cutting device, by providing the cutting wheels with sharp overlapping cutting edges, and by providing said cutting wheels, on both sides of each thereof, with beveled, serrated or corrugated feeding surfaces. Both cutting wheels may be and preferably are made alike, but are reversed, the one in respect to the other. The serrated or corrugated beveled feeding surface on one side of the wheel extends to the sharp cutting edge thereof, and preferably forms the said sharp cutting edge with a series of teeth-like projections with intervening sharp edged notches; while the beveled and serrated or corrugated surfaces on the opposite side cutting wheel terminates far enough inward of the sharp cutting edge of said wheel to permit two co-operating reversely set wheels to run with their sharp cutting edges in close but overlapping contact, as required to produce a good cutting action.

The invention is illustrated in the accompanying drawings wherein like characters indicate like parts throughout the several views.

Referring to the drawings:

Fig. 1 shows the cutting device in side elevation, the co-operating wheels being in vertical axial section;

Fig. 2 is a fragmentary view of the cutting wheels on an enlarged scale, taken in section on the line 2—2 of Fig. 3; and Fig. 3 is a fragmentary view in front elevation showing portions of the two cutting wheels.

As shown in the drawings, each cutting wheel is made up of two sections 4 and 5 rigidly secured together so that they form, in effect, integral structures, but the said cutting wheels may be made, each an integral member. These cutting wheels, as shown, are rigidly, but detachably secured by machine screws 6 to the projecting ends of parallel spindles 7 that are rotatively mounted in a suitable bearing block or pedestal 8 and are connected for common rotation in reverse direction, but at the same speed, by intermeshing gears 9. One of the shafts 7 is extended so that it may be power driven by any suitable well known means, or may be driven by a hand operated crank, or any other suitable device not necessary for the purposes of this case to further consider.

By reference to the drawings, it will be seen that the two cutting wheels are formed, as above briefly described, and are set for co-operative action in reverse arrangement. More specifically stated, each wheel is, as shown, provided on one side with a beveled radially corrugated outer edge surface $4^a$ that extends to the sharp cutting edge of the wheel section 4 and forms a plurality of chisel-edged projecting teeth $4^b$ and intervening sharp-edged notches $4^c$; and each wheel section 5 is, in a similar manner, provided with a beveled radially corrugated edge surface $5^a$ that terminates in chisel-edged teeth or projections $5^b$ and intervening sharp-edged notches $5^c$. The chisel-edged projections $5^b$ of the wheel sections 5 terminate radially considerably inward of the chisel-edged projections 4ᵇ of the wheel sections 4. The one cutting wheel (see Fig. 1) is set with its section 4 on the outer side and the other cutting wheel is set with its section 4 on the inner side; and the sections 4 of the two cutting wheels are arranged to run overlapped, as shown in the drawings, to produce the cutting action.

By reference particularly to Fig. 2, it will be noted that when the cutting wheels are in action on a heavy piece of leather $y$, or the like, said material $y$ will not only be cut, but will be positively fed forward by four sets of corrugations, towit, by the corrugations 4ᵃ and 5ᵃ of the upper and lower cutting wheels. Also, the chisel-like teeth 4ᶜ and 5ᶜ materially assist in feeding of the heavy material $y$ between the cutting wheels.

It is, of course, obvious that the sharp edges of the cutting wheels have the greatest overlap on a line that intersects the axes of rotation of the wheels; and it is on this line that the leather will be turned when it is to be cut on a serpentine, curved or line other than a straight line. It will be further noted that from the above described intersecting line, the reversely beveled serrated or corrugated surfaces of the two wheels have increasing convergence both forwardly and rearwardly, so that these beveled serrated feeding surfaces do not prevent easy turning of the leather to the one side or the other. Wheels provided with flat faces, on the contrary, would make it very difficult to turn the leather so as to feed the same on a curved line. Moreover, the reversely beveled corrugated feeding surfaces on both wheels not only produce double feeding actions for both wheels, but evenly hold the leather from both sides so that it cannot slip backwardly, or otherwise, while it is being turned for curved line feed movement.

In actual practice, this cutting device has been found highly efficient, especially for the cutting of shoe soles from heavy sole leather, but it will be found efficient generally for cutting heavy leather sheets, leather belts, vulcanized canvas belts, and the like.

What I claim is:

1. A cutting device of the kind described comprising a pair of rotary cutting wheels having sharp edges set to run with close overlapping engagement, each of said cutting wheels having serrated reversely beveled marginal feeding surfaces which, on the one side, extend to the sharp edges thereof, and on the other sides terminate radially inward of said outer edges.

2. A cutting device of the kind described comprising a pair of rotary cutting wheels having sharp edges set to run with close overlapping engagement, each of said cutting wheels having serrated reversely beveled marginal feeding surfaces which, on the one side, extend to the sharp edges thereof, and on the other sides, terminate radially inward of said outer edges, the serrations of said beveled surfaces forming chisel-edged teeth that project beyond intervening sharp-edged notches, said two cutting wheels having their like faces reversed.

3. A cutting device of the kind described comprising a pair of rotary cutting wheels having sharp edges set to run with close overlapping engagement, each of said cutting wheels having serrated reversely beveled marginal feeding surfaces which, on the one side, extend to the sharp edges thereof, and on the other side terminate radially inward of said outer edges, the said cutting wheels being of the same diameter, and means for rotating said cutting wheels in opposite directions at the same speed.

4. A cutting device of the kind described comprising a pair of rotary cutting wheels having sharp edges set to run with close overlapping engagement, each of said cutting wheels having serrated reversely beveled marginal feeding surfaces which, on the one side, extend to the sharp edges thereof, and on the other side terminate radially inward of said outer edges, the said cutting wheels being made up of two sections, each section having its own independently formed beveled serrated marginal surface.

5. A cutting wheel provided with reversely beveled marginal feeding surfaces formed with approximately radial corrugations, the beveled corrugated surfaces on opposite sides of said cutting wheel being in radially different zones, and on the one side, being extended to the periphery of the wheel and forming chisel-edged marginal teeth and sharp-edged intervening notches.

6. A cutting wheel comprising two concentrically arranged disks having contacting plane surfaces and outwardly disposed beveled and radial grooved surfaces, the wheels being of different diameter.

7. The structure set forth in claim 6, the edges of the wheels being notched at the circumferential edges of said grooves, and sharp chisel-shaped teeth being formed between said grooves.

8. A cutting device for sheet material having in combination a pair of disk cutters, each comprising a pair of concentric disks of different diameter having plane surfaces in contact and having outer surfaces beveled and radially grooved adjacent their edges, the plane sides of the larger disks of each pair arranged in overlapping engagement.

In testimony whereof I affix my signature.

GEORGE ORVILL TERRY,